Figure 1:
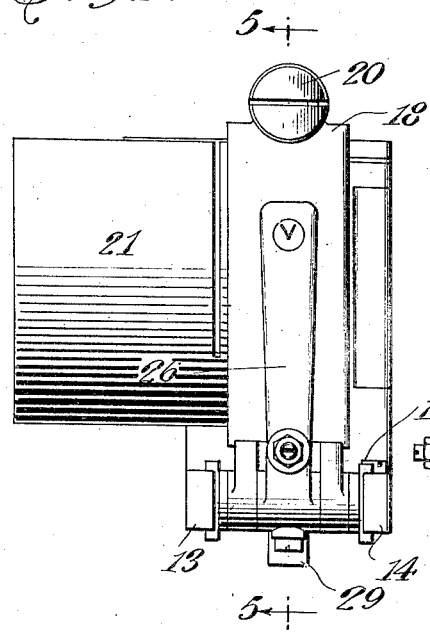

Oct. 25, 1932.    A. KINDELMANN    1,884,731
LENS SHIFTING DEVICE
Filed Nov. 3, 1930    2 Sheets-Sheet 1

INVENTOR
Albert Kindelmann
BY
Austin & Dix
ATTORNEYS

Oct. 25, 1932.  A. KINDELMANN  1,884,731
LENS SHIFTING DEVICE
Filed Nov. 3, 1930   2 Sheets-Sheet 2

INVENTOR
Albert Kindelmann
BY
ATTORNEYS

Patented Oct. 25, 1932

1,884,731

UNITED STATES PATENT OFFICE

ALBERT KINDELMANN, OF FLORAL PARK, NEW YORK, ASSIGNOR TO INTERNATIONAL PROJECTOR CORPORATION, OF NEW YORK, N. Y., A CORPORATION OF DELAWARE

LENS SHIFTING DEVICE

Application filed November 3, 1930. Serial No. 492,999.

This invention relates to an improved apparatus for shifting lenses in motion picture machines especially in projectors wherein both the ordinary film and the movie-tone film may be used.

An object of the invention is to provide a simple, compact, and efficient small device which can be economically produced and easily assembled on a projector to shift the lens holders for the purpose above mentioned.

A further object is to provide a device which can effect the shift merely by the flick of a finger of the operator.

A still further object is to provide a shift device which when set can be depended upon to cause the movement of the lens holder from one predetermined position to another predetermined position with the greatest possible ease and accuracy.

Further and more specific objects, features, and advantages will more clearly appear when considered in connection with the accompanying drawings which form part of the specification and which illustrate a present preferred form of the invention.

Briefly considered in general terms the invention comprises a lens holder on a support attached to the frame of the machine in such a manner that the whole device may be moved longitudinally of the machine for the purpose of focussing the lenses as is usual. The support is preferably mounted on a bracket to slide thereon, when adjusted, in a direction at right angles to the direction of the focussing movement. The shift is generally cross-wise of the machine and is effected by the movement, in one direction or the opposite, of a simple, easily reached and operated lever or arm. This arm is preferably provided with stop members which can be separately adjusted to exactly determine the position in which the lever stops in the extreme position of its movement in either direction. The simple adjustment of the stop member will permit the variation and adjustment of these predetermined positions of the lever and consequently of the support. The operating lever preferably is mounted on and in association with the slidable support and is connected to a shaft which is eccentrically related to a fixed part of the bracket so that as the shaft is moved the support is moved laterally in one direction or the opposite as may be desired. Further points of invention will later appear and involve certain details of construction which enhance the simplicity and practicability of the device from the commercial and manufacturing standpoint.

Figure 2:
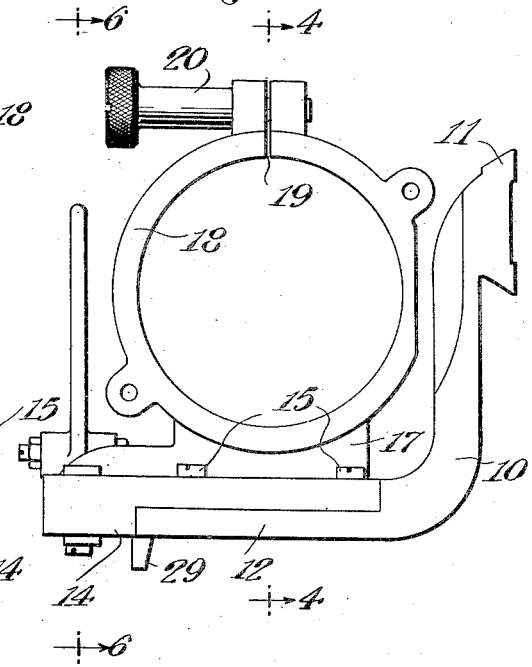
Figure 3:
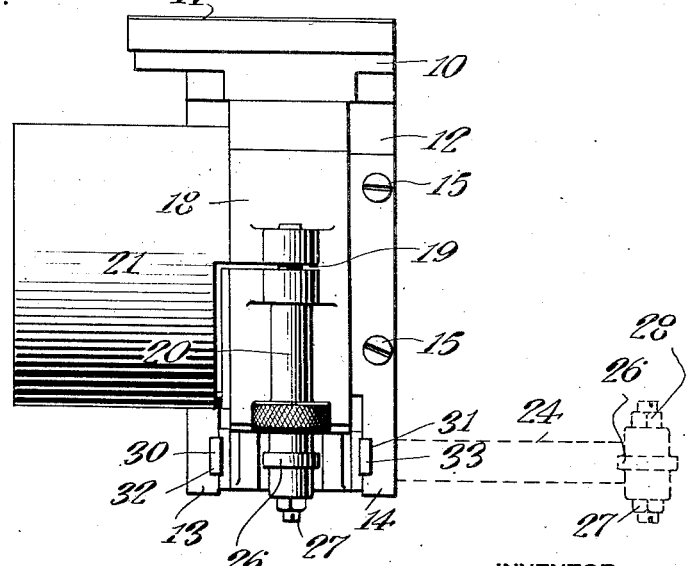
Figure 4:
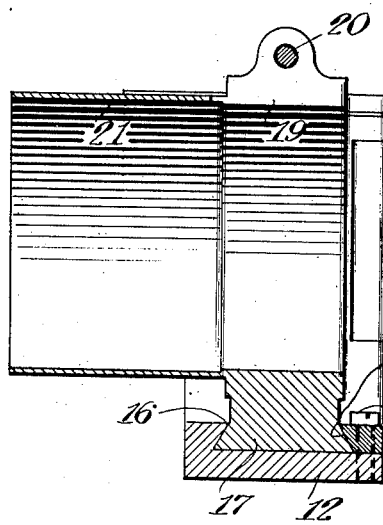
Figure 5:
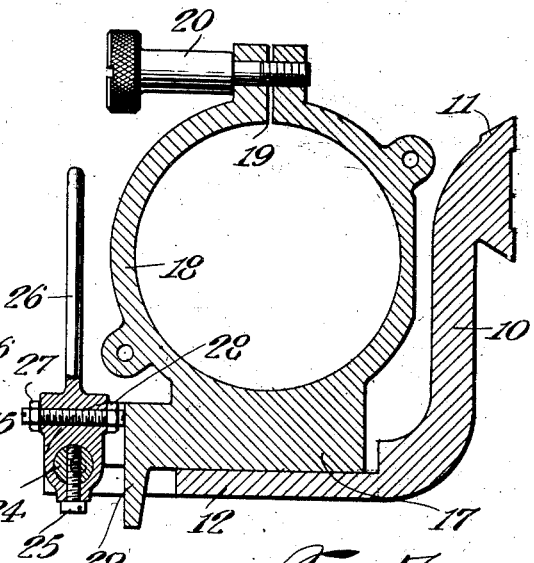
Figure 6:
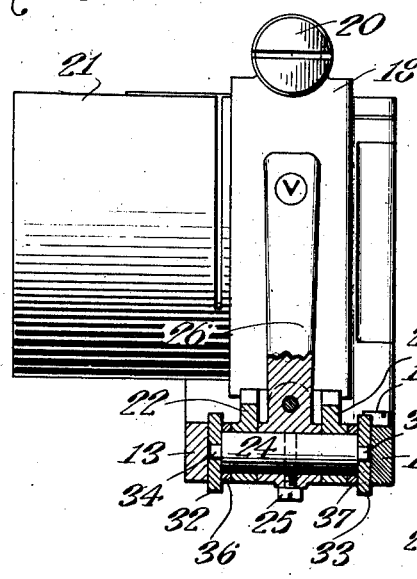

The present preferred form of the invention is illustrated in the accompanying drawings of which, Fig. 1 is a side elevation of the shift devise;
Fig. 2 is a front elevation thereof;
Fig. 3 is a top plan view thereof;
Fig. 4 is a vertical longitudinal section taken on the line 4—4 of Fig. 2;
Fig. 5 is a vertical cross section in part taken on the line 5—5 of Fig. 1;
Fig. 6 is a vertical longitudinal section i part taken on the line 6—6 of Fig. 2; and,
Fig. 7 is a front elevation of the device with certain parts broken away.

As shown in the drawings the present preferred form of the invention is illustrated therein and comprises a bracket element having a vertical arm 10, the upper end of which is provided with a tongue 11 which is adapted to slide in a similarly shaped groove on the supporting plate of the projector or apparatus. The lower end of this bracket is disposed horizontally as element 12. While this preferred bracket is illustrated and described as herein set forth, it will be understood that an equivalent member could be a circular member, or of any other formation so long as both the holding of the lens and the sliding movement of the support are permitted. The outer end of the element 12 is preferably formed as spaced arms 13 and 14. The arm 13 is preferably integral with the element 12 but the arm 14 is separate therefrom but fastened thereto by means of screws 15. Both arms 13 and 14 intermediate their ends are provided with bevelled inner walls such as 16 between which is received the lower tongue-shaped end of a standard member 17. This standard member preferably is integrally formed with a ring element 18 on the top thereof to receive and support a lens tube or holder. The ring element 18 is split as at 19 and held in clamping position by means of the usual clamping screw 20. Laterally thereof the ring is preferably provided with an integral or attached sleeve 21 to enclose the lens tube for protection and to confine the projection light.

The forward end of the standard 17 is provided with two spaced arms 22 and 23 bored to receive a stub shaft 24. On the middle of the stub shaft 24 there is fixed by screw 25 an operating arm or handle 26. This operating arm 26 is provided with a pair of stop screws 27 and 28 which are adjustable and which are adapted to abut the adjacent surface of the forward face 29 of the standard which lies between the spaced arms 13 and 14. The adjacent faces of the arms 13 and 14 are provided with vertical slots such as 30 and 31 (see Fig. 3) and in these slots are adapted to slide small plates or blocks 32 and 33. These blocks act as bearings for and receive the pin ends 34 and 35 on the stub shaft 24 and these pins 34 and 35 are mounted on the stub shaft 24 eccentric thereof. Small spacing rings 36 and 37 are disposed between the outer faces of arms 22 and 23 and the respective small blocks 32 and 33.

Figure 7:
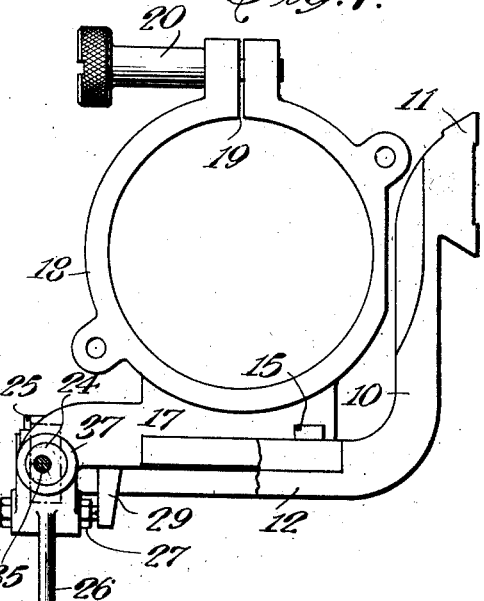

It will be seen that when the arm 26 is disposed in the position shown in Fig. 5 that the lens ring is positioned further from the bracket arm 10 than when the operating arm 26 is disposed in the position shown in Fig. 7. The position of the arm and consequently the position of the whole device can be accurately gauged by means of the stop members or screws 27 and 28 so that a fine degree of adjustment is made possible. To remove the lens supporting element it is merely necessary to remove the screws 15 whereupon the separate portion 14 on that side of the arm 12 can be removed and the lens supporting standard can be slid sidewise out of the device. The receipt of the eccentric pins 34 and 35 in the small blocks 32 and 33 permits the sliding movement of the standard altho the pins themselves will move slightly up and down as well as in a horizontal direction. It will also be clearly understood that the actual arm 26 instead of being mounted on the stub shaft 24 as shown may be connected to an extension thereof at the front or the back of the machine or projector so as to be operated from without the casing thereof but this change does not affect the operation of the parts herein described nor does it affect the invention herein. This modification is indicated in dotted lines in Fig. 3 of the drawings. This modified construction thus meets the requirements of the law in certain states.

Thus there has been provided a simple compact and efficient device whereby the lens holder may be shifted readily and easily from one predetermined position to another so that for instance in one position may be alined with the axis of an ordinary film aperture and in another position may be alined with the center of a modified aperture such as is used when movietone film is being employed. This accuracy of this alinement is made certain by means of the easily and accurately adjusted stops 27 and 28. To make the shift merely requires the turning of the lever 26 from one position to another until the engagement of the stops prevent further movement. The parts are simple and can be readily assembled, removed, and adjusted.

While the invention has been herein described in detail and with respect to a present preferred form thereof, it is not intended that the invention be limited to such details and forms since many changes and modifications may be made and the invention embodied in other forms and modifications without departing from the spirit and scope of the invention in its broadest aspects. Hence it is desired to cover any and all forms and modifications of the invention which may come within the language or scope of any one or more of the appended claims.

What is claimed, is,

1. In a motion picture apparatus, a lens supporting member, a bracket for said support, means for moving the bracket longitudinally of the apparatus for focussing the lens, an operating lever on the support, and cam means between the lever and the bracket to shift the support on the bracket when the lever is operated.

2. In a motion picture apparatus, a lens supporting member, a bracket for said support, a connection between the bracket and the support to permit sliding of the support on the bracket, a lever on the support for operating it, an eccentrically disposed shaft on the support and eccentrically related and connected to the bracket, said shaft turned by said lever, and sliding blocks on the bracket forming bearings for the ends of said shaft.

3. In a motion picture apparatus a lens shifting device comprising a lens support, a bracket for supporting said support, and allowing sliding movement therein, an eccentric means mounted in association with said support and said bracket for moving said support relatively to said bracket, and a handle extending from said eccentric means for operating the same.

4. In a motion picture apparatus a lens shifting device comprising a lens support, a bracket for supporting said support and allowing sliding movement therein, an eccentric means mounted in association with said support and said bracket for moving said support relatively to said bracket, and a handle extending from said eccentric means for operating the same, and stop elements associated with the handle and the eccentric means to determine the limiting positions of the support on the bracket.

5. In a motion picture apparatus a lens shifting device comprising a lens support, a bracket for supporting said support and allowing sliding movement therein, an eccentric means mounted in association with said support and said bracket for moving said support relatively to said bracket, and a handle extending from said eccentric means for operating the same, the axis of the eccentric means being parallel to the axis of movement of the bracket in focussing the lenses.

6. In a motion picture apparatus a lens shifting device which comprises an operating lever, a shaft to which said lever is connected, a support on which said shaft is turnable, a bracket on which said support is mounted, pins on the ends of said shaft, sliding blocks on the bracket into which said pins extend to bear therein, said pins being disposed eccentrically from the center line of the shaft.

7. In a motion picture apparatus a lens shifting device which comprises an operating handle, a shaft to which said handle is connected, a support on which said shaft is turnable, a bracket on which said support is mounted, a tongue and groove connection between the bracket and the support, spaced arms on said bracket, said arms having slots in adjacent faces thereof, sliding blocks disposed in said slots, pins on the ends of said shaft and bearing in said blocks, said pins being disposed eccentrically of the center line of the shaft.

8. In a motion picture apparatus a lens shifting device which comprises an operating lever, a shaft to which said lever is connected, a support on which said shaft is turnable, a bracket on which said support is mounted, a tongue and groove connection between the bracket and the support, spaced arms on said bracket, said arms having slots in adjacent faces thereof, sliding blocks disposed in said slots, pins on the ends of said shaft and bearing in said blocks, said pins being disposed eccentrically of the center line of the shaft, stop elements on the lever to limit its extreme positions, said stop members disposed to contact with portions of the support when the lever is in either extreme position.

9. In a motion picture apparatus a lens shifting device comprising a lens support, a bracket for supporting said support and allowing sliding movement therein, a tongue and groove connection between the support and the bracket to permit said sliding movement, an eccentric shaft disposed on the support with its axis parallel to the axis of movement of the bracket in focussing the lenses, spaced arms on the bracket between which the shaft is disposed, said arms having slots in adjacent faces thereof, sliding blocks disposed in said slots, pins on the ends of said shaft and disposed in and bearing in said blocks, said pins being disposed eccentrically with respect to the center axis of said shaft, and a handle associated with the shaft for turning it and operating the support from one position to another, and stop elements associated with the handle and the shaft to limit the extreme positions thereof.

In testimony whereof I have hereunto set my hand.

ALBERT KINDELMANN.